(12) United States Patent
Yang et al.

(10) Patent No.: US 11,594,823 B2
(45) Date of Patent: Feb. 28, 2023

(54) DISCRETE ANTENNA MODULE WITH VIA WALL STRUCTURE

(71) Applicant: QUALCOMM Incorporated, San Diego, CA (US)

(72) Inventors: Taesik Yang, San Diego, CA (US); Mohammad Ali Tassoudji, San Diego, CA (US); Jeongil Jay Kim, San Diego, CA (US); Darryl Sheldon Jessie, San Diego, CA (US); Kevin Hsi-Huai Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 17/119,638

(22) Filed: Dec. 11, 2020

(65) Prior Publication Data
US 2022/0190485 A1 Jun. 16, 2022

(51) Int. Cl.
| H01Q 21/00 | (2006.01) |
| H01Q 21/06 | (2006.01) |
| H01Q 5/307 | (2015.01) |
| H01Q 1/24 | (2006.01) |
| H01Q 19/10 | (2006.01) |
| H01Q 1/48 | (2006.01) |
| H01Q 21/10 | (2006.01) |

(52) U.S. Cl.
CPC ............ *H01Q 21/065* (2013.01); *H01Q 1/24* (2013.01); *H01Q 1/48* (2013.01); *H01Q 5/307* (2015.01); *H01Q 19/10* (2013.01); *H01Q 21/0006* (2013.01); *H01Q 21/10* (2013.01)

(58) Field of Classification Search
CPC ........ H01Q 21/065; H01Q 5/307; H01Q 1/24; H01Q 1/48; H01Q 19/10; H01Q 21/10; H01Q 21/0006
See application file for complete search history.

(56) References Cited

U.S. PATENT DOCUMENTS

2019/0273325 A1* 9/2019 Ryoo .................. H01Q 21/067

* cited by examiner

*Primary Examiner* — Joseph J Lauture
(74) *Attorney, Agent, or Firm* — Sunstein LLP (57) ABSTRACT

Techniques are provided for improving the performance of a multi-band antenna in a wireless device. An example wireless device includes at least one radio frequency integrated circuit, and at least one patch antenna operably coupled to the at least one radio frequency integrated circuit, including a first patch operably coupled to the at least one radio frequency integrated circuit, a ground plane disposed below the first patch, and a plurality of via wall structures disposed around the first patch, wherein each of the plurality of via wall structures is electrically coupled to the ground plane.

30 Claims, 10 Drawing Sheets

DISCRETE ANTENNA MODULE WITH VIA WALL STRUCTURE

BACKGROUND

A wireless device (e.g., a cellular phone or a smart phone) may include a transmitter and a receiver coupled to an antenna to support two-way communication. The antenna may be enclosed within a housing assembly (e.g., cover) based on portability and aesthetics design considerations. In general, the transmitter may modulate a radio frequency (RF) carrier signal with data to obtain a modulated signal, amplify the modulated signal to obtain an output RF signal having the proper power level, and transmit the output RF signal via the antenna to a base station. For data reception, the receiver may obtain a received RF signal via the antenna and may condition and process the received RF signal to recover data sent by the base station. As the radio frequency used by the wireless device increases, the complexity of the RF transmitting circuitry also increases. To facilitate and/or enable wireless signal applications, numerous types of antennas have been developed, with different antennas used based on the needs of an application. e.g., distance, frequency, operational frequency bandwidth, antenna pattern beam width, gain, beam steering, etc. Additionally, newer RF technologies and wireless devices are becoming more reliant on multi-band performance.

SUMMARY

An example wireless device according to the disclosure includes at least one radio frequency integrated circuit, and at least one patch antenna operably coupled to the at least one radio frequency integrated circuit, including a first patch operably coupled to the at least one radio frequency integrated circuit, a ground plane disposed below the first patch, and a plurality of via (i.e., vertical interconnect access) wall structures disposed around the first patch, wherein each of the plurality of via wall structures is electrically coupled to the ground plane.

Implementations of such a wireless device may include one or more of the following features. A second patch may be operably coupled to the at least one radio frequency integrated circuit, such that the second patch may be disposed between the first patch and the ground plane. The first patch may be configured to operate in a first frequency range and the second patch may be configured to operate in a second frequency range. A via spacing between each of the plurality of via wall structures may be based on the first frequency range. A via spacing between each of the plurality of via wall structures may be based on the second frequency range. The first frequency range may be 37-40 GHz and the second frequency range may be 24-30 GHz. The first patch and the second patch may be configured for horizontally polarized signals and vertically polarized signals. The first patch may be a square patch with side lengths of 1.6 millimeters, and the second patch may be a square patch with side lengths of 2.4 millimeters. A height of each of the via wall structures may be within a range of 100-400 microns. A via spacing between each of the plurality of via wall structures may be in a range of 0.2 to 0.3 millimeters. A surface patch may be disposed above the first patch, such that the surface patch is capacitively coupled to the first patch. One or more reflector patches may be disposed adjacent to and coplanar with the surface patch.

An example patch antenna according to the disclosure includes a first patch disposed on a dielectric substrate, a ground plane disposed below the first patch, such that the dielectric substrate is within a gap between the first patch and the ground plane, and a plurality of via wall structures disposed around the first patch, wherein each of the plurality of via wall structures is electrically coupled to the ground plane and extend orthogonally from the ground plane towards the first patch.

Implementations of such a patch antenna may include one or more of the following features. A second patch may be disposed within the dielectric substrate, such that the second patch is disposed within the gap between the first patch and the ground plane. The first patch may be configured to operate in a first frequency range and the second patch may be configured to operate in a second frequency range. A via spacing between each of the plurality of via wall structures may be based on the first frequency range. A via spacing between each of the plurality of via wall structures may be based on the second frequency range. The first frequency range may be 37-40 GHz and the second frequency range may be 24-30 GHz. The first patch and the second patch may be configured for horizontally polarized signals and vertically polarized signals. The first patch may be a square patch with side lengths of 1.6 millimeters, and the second patch may be a square patch with side lengths of 2.4 millimeters. A height of each of the via wall structures may be within a range of 100-400 microns. A via spacing between each of the plurality of via wall structures may be in a range of 0.2 to 0.3 millimeters. A surface patch may be disposed above the first patch on a top surface of the dielectric substrate, such that the surface patch is capacitively coupled to the first patch. One or more reflector patches may be disposed on the top surface of the dielectric substrate adjacent to the surface patch.

An example patch antenna array according to the disclosure includes a plurality of patch antennas disposed on a mounting substrate, such that each patch antenna includes a first patch disposed on a dielectric substrate, a ground plane disposed below the first patch, wherein the dielectric substrate is within a gap between the first patch and the ground plane, and a plurality of via wall structures disposed around the first patch, such that each of the plurality of via wall structures is electrically coupled to the ground plane and extend orthogonally from the ground plane towards the first patch.

Implementations of such a patch antenna array may include one or more of the following features. Each of the plurality of patch antennas may include a second patch disposed within the dielectric substrate, such that the second patch is disposed within the gap between the first patch and the ground plane. The first patch and the second patch of each of the plurality of patch antennas may be operably coupled to a radio frequency integrated circuit. The plurality of patch antennas may be disposed in a 1 by 5 array. The plurality of patch antennas may be disposed in a 2 by 5 array.

An example patch antenna according to the disclosure includes a dielectric substrate having a top surface and a bottom surface, a surface patch disposed on the top surface of the dielectric substrate, a high frequency patch disposed within the dielectric substrate and below the surface patch, wherein the surface patch is capacitively coupled to the high frequency patch, a low frequency patch disposed within the dielectric substrate and between the high frequency patch and the bottom surface of the dielectric substrate, a ground plane disposed on the bottom surface of the dielectric substrate, and a plurality of via wall structures disposed within the dielectric substrate in a perimeter around the high frequency patch and the low frequency patch, wherein each of the plurality of via wall structures are electrically coupled to the ground plane and extend orthogonally from the ground plane towards the top surface of the dielectric substrate Items and/or techniques described herein may provide one or more of the following capabilities, as well as other capabilities not mentioned. A patch antenna may include active elements on various parallel planes within a dielectric substrate, and conductive vias to connect different elements in the planes. Conductive vias may be used to form wall structures around the active elements. A patch antenna may include a first patch for operating in a first frequency range, and a second patch for operating in a second frequency range. The first patch and the second patch may be disposed within a perimeter of vias wall structures. The first and second patches may be operably coupled to a radio frequency integrated circuit via feed lines. The first and second patches may be vertically and horizontally polarized. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Techniques are discussed herein for improving the performance of a multi-band antenna in a wireless device. Many mobile devices include millimeter-wave (MMW) modules to support higher RF frequencies (e.g., $5^{th}$ Generation specifications). In general, MMW 5G provides wide bandwidths in small cells, which may require a phased array antenna to overcome high signal propagation loss at mmWave. A single phased array antenna module to support multiple MMW bands such as 25 GHz, 28 GHz and 39 GHz is desired to reduce module size and cost. In an example, the antenna modules provided herein utilize via (i.e., vertical interconnect access) wall structures to strength the ground condition and isolate individual modules. The via wall structures in the antenna modules improves coupling (i.e., isolation) between ports, improves antenna gain, and increases cross-pole (X-pol) level for improved polarization for Multiple-Input Multiple-Output (MIMO) operation. These techniques are examples only, and not exhaustive.

Figure 1:
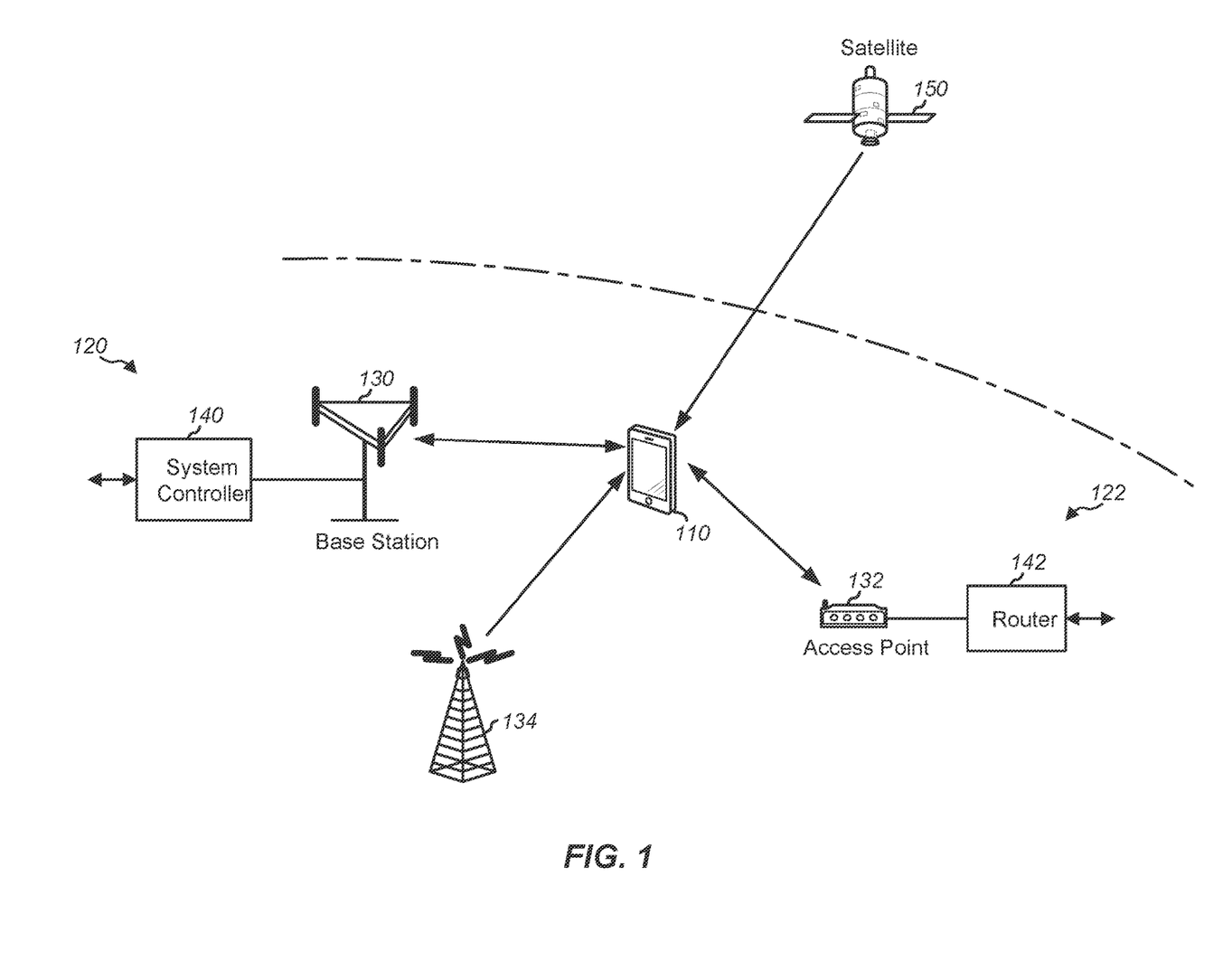
FIG. 1 is an example wireless device capable of communicating with different wireless communication systems.

Referring to FIG. 1, a wireless device 110 capable of communicating with different wireless communication systems 120 and 122 is shown. The wireless system 120 may be a Code Division Multiple Access (CDMA) system (which may implement Wideband CDMA (WCDMA), cdma2000, or some other version of CDMA), a Global System for Mobile Communications (GSM) system, a Long Term Evolution (LTE) system, a 5G New Radio (NR) system, etc. The wireless system 122 may be a wireless local area network (WLAN) system, which may implement IEEE 802.11, etc. For simplicity, FIG. 1 shows the wireless system 120 including a base station 130 and a system controller 140, and the wireless system 122 including an access point 132 and a router 142. In general, each system may include any number of stations and any set of network entities.

The wireless device 110 may also be referred to as a user equipment (UE), a mobile device, a mobile station, a terminal, an access terminal, a subscriber unit, a station, etc. The wireless device 110 may be a cellular phone, a smart phone, a tablet, a wireless modem, a personal digital assistant (PDA), a handheld device, a laptop computer, a smartbook, a netbook, a cordless phone, a wireless local loop (WLL) station, a Bluetooth device, etc. The wireless device 110 may be equipped with any number of antennas. Multiple antennas may be used to provide better performance, to simultaneously support multiple services (e.g., voice and data), to provide diversity against deleterious path effects (e.g., fading, multipath, and interference), to support multiple-input multiple-output (MIMO) transmission to increase data rate, and/or to obtain other benefits. The wireless device 110 may be capable of communicating with one or more wireless systems 120 and/or 122. The wireless device 110 may also be capable of receiving signals from broadcast stations (e.g., a broadcast station 134). The wireless device 110 may also be capable of receiving signals from satellites (e.g., a satellite 150), for example in one or more global navigation satellite systems (GNSS).

In general, the wireless device 110 may support communication with any number of wireless systems, which may employ any radio technologies such as WCDMA, cdma2000, LTE, 5G NR, GSM, 802.11, GPS, etc. The wireless device 110 may also support operation on any number of frequency bands.

The wireless device 110 may support operation at a very high frequency, e.g., within millimeter-wave (MMW) frequencies from 24 to 300 gigahertz (GHz). For example, the wireless device 110 may be capable to operate with tri-bands such as 24.25-27.5 GHz, 27.5-28.35 GHz and 37-40 GHz. Other 5G bands, such as 60 GHz may also be realized with the wireless device 110. The wireless device 110 may include an antenna system to support CA operations at MMW frequencies. The antenna system may include a number of antenna elements, with each antenna element being used to transmit and/or receive signals. The terms "antenna" and "antenna element" are synonymous and are used interchangeably herein. Generally, each set of antenna elements may be implemented with a patch antenna or a strip-shaped radiators. A suitable antenna type may be selected for use based on the operating frequency of the wireless device, the desired performance, etc. In an exemplary design, an antenna system may include a number of patch and/or strip-type antennas supporting operation at MMW frequencies.

Figure 2:
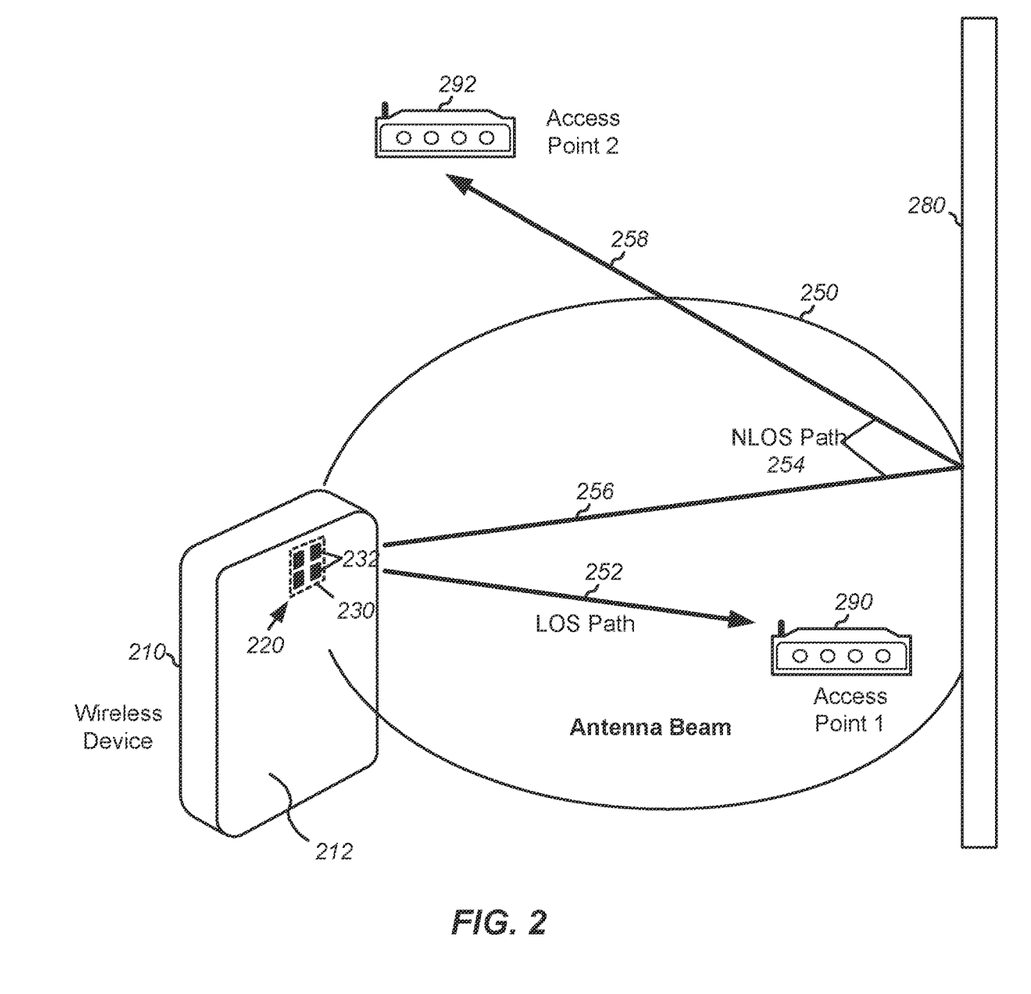
FIG. 2 is an example wireless device with a 2-dimensional (2-D) antenna system.

Referring to FIG. 2, an example design of a wireless device 210 with a 2-D antenna system 220 is shown. In this example design, antenna system 220 includes a 2×2 array 230 of four patch antennas 232 (i.e., radiators) formed on a single geometric plane corresponding to a back surface of the wireless device 210 (e.g., a backside array). While the antenna system 220 is visible in FIG. 2, in operation the patch array may be disposed on a PC board, antenna carrier, or other assembly or mounting substrate located on an inside surface of a device cover 212. The patch antenna array 230 has an antenna beam 250, which may be formed to point in a direction that is orthogonal to the plane on which the patch antennas 232 are formed or in a direction that is within a certain angle of orthogonal, for example up to 60 degrees in any direction from orthogonal. The wireless device 210 can transmit signals directly to other devices (e.g., access points) located within the antenna beam 250 and can also receive signals directly from other devices located within the antenna beam 250. The antenna beam 250 thus represents a line-of-sight (LOS) coverage of wireless device 210.

An antenna element may be formed on a plane corresponding to a surface of a wireless device and may be used to transmit and/or receive signals. The antenna element may have a particular antenna beam pattern and a particular maximum antenna gain, which may be dependent on the design and implementation of the antenna element. Multiple antenna elements may be formed on the same plane and used to improve antenna gain. Higher antenna gain may be especially desirable at MMW frequency since (i) it is difficult to efficiently generate high power at MMW frequency and (ii) attenuation loss may be greater at MMW frequency.

For example, an access point 290 (i.e., another device) may be located inside the LOS coverage of the wireless device 210. The wireless device 210 can transmit a signal to access point 290 via a line-of-sight (LOS) path 252. Another access point 292 may be located outside the LOS coverage of the wireless device 210. The wireless device 210 can transmit a signal to access point 292 via a non-line-of-sight (NLOS) path 254, which includes a direct path 256 from the wireless device 210 to a wall 280 and a reflected path 258 from the wall 280 to the access point 292.

In general, the wireless device 210 may transmit a signal via a LOS path directly to another device located within the antenna beam 250, e.g., as shown in FIG. 2. Ideally, this signal may have a much lower power loss when received via the LOS path. The low power loss may allow wireless device 210 to transmit the signal at a lower power level, which may enable wireless device 210 to conserve battery power and extend battery life.

The wireless device 210 may transmit a signal via a NLOS path to another device located outside of antenna beam 250, e.g., as also shown in FIG. 2. This signal may have a much higher power loss when received via the NLOS path, since a large portion of the signal energy may be reflected, absorbed, and/or scattered by one or more objects in the NLOS path. The wireless device 210 may transmit the signal at a high power level in an effort to ensure that the signal can be reliably received via the NLOS path.

Figure 3:
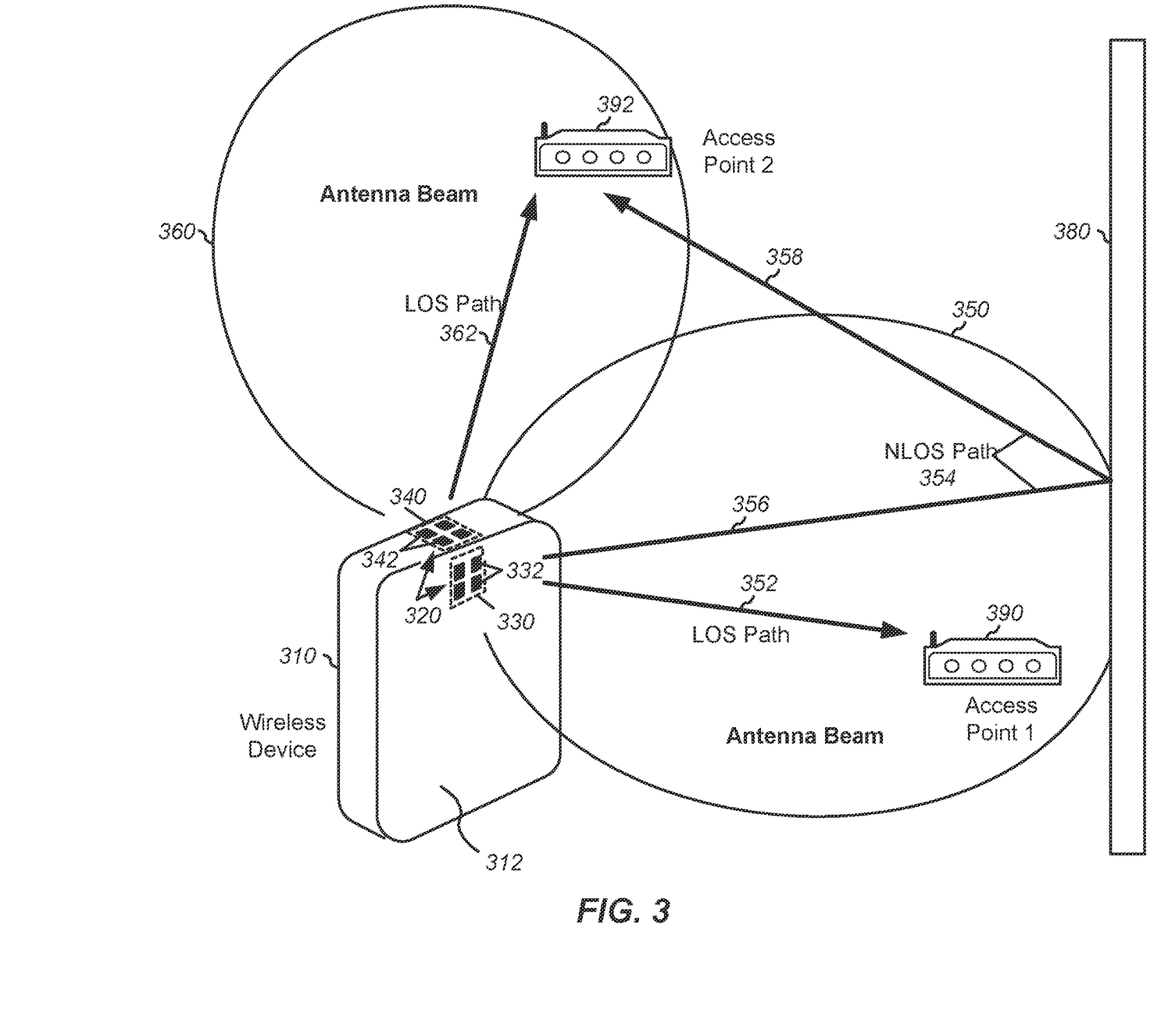
FIG. 3 is an example wireless device with a 3-dimensional (3-D) antenna system.

Referring to FIG. 3, an example design of a wireless device 310 with a 3-D antenna system 320 is shown. In this example design, the antenna system 320 includes (i) a 2×2 array 330 of four patch antennas 332 formed on a first plane corresponding to the back surface of the wireless device 310 and (ii) a 2×2 array 340 of four patch antennas 342 formed on a second plane corresponding to the top surface of the wireless device 310 (e.g., an end-fire array). The patch antenna arrays 330, 340 are disposed on the inside of a device cover 312. The antenna array 330 has an antenna beam 350, which points in a direction that is orthogonal to the first plane on which the patch antennas 332 are formed. The antenna array 340 has an antenna beam 360, which points in a direction that is orthogonal to the second plane on which the patch antennas 342 are formed. In an example, the array 330 may point in a direction that is within a certain angle of orthogonal, for example up to 60 degrees in any direction from orthogonal. The antenna beams 350, 360 represent the LOS coverage of the wireless device 310. While the arrays 330 and 340 are each illustrated as a 2×2 array in FIG. 3, one or both may include a greater or fewer number of antennas, and/or the antennas may be disposed in a different configuration. For example, one or both of the arrays 330 and 340 may be configured as a 1×4, 1×5, 1×8, 2×5 or other array dimensions.

An access point 390 (i.e., another device) may be located inside the LOS coverage of the antenna beam 350 but outside the LOS coverage of the antenna beam 360. The wireless device 310 can transmit a first signal to access point 390 via a LOS path 352 within the antenna beam 350. Another access point 392 may be located inside the LOS coverage of the antenna beam 360 but outside the LOS coverage of the antenna beam 350. The wireless device 310 can transmit a second signal to the access point 392 via a LOS path 362 within the antenna beam 360. The wireless device 310 can transmit a signal to the access point 392 via a NLOS path 354 composed of a direct path 356 and a reflected path 358 due to a wall 380. The access point 392 may receive the signal via the LOS path 362 at a higher power level than the signal via the NLOS path 354.

The wireless device 310 shows an example design of a 3-D antenna system comprising two 2×2 antenna arrays 330, 340 formed on two planes (e.g., backside and end-fire arrays). In general, a 3-D antenna system may include any number of antenna elements formed on any number of planes pointing in different spatial directions. The planes may or may not be orthogonal to one another. Any number of antennas may be formed on each plane and may be arranged in any formation. The antenna arrays 330, 340 may be formed on an antenna mounting substrate and/or within the device cover 312.

Figure 4:
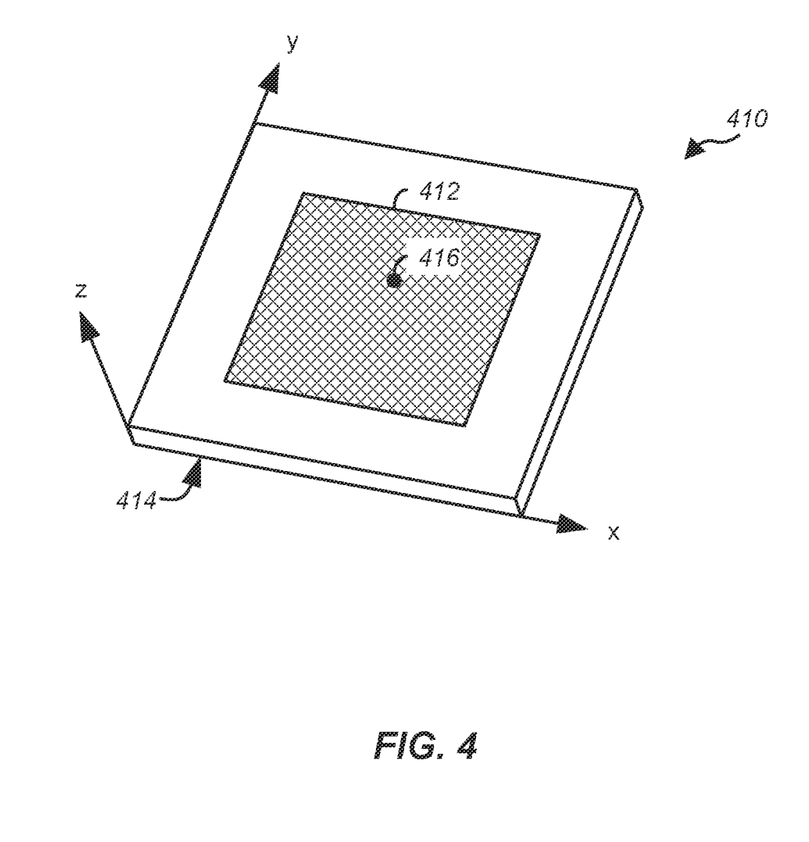
FIG. 4 is an example design for a patch antenna.

Referring to FIG. 4, an example design of a patch antenna 410 suitable for MMW frequencies is shown. The patch antenna 410 includes a radiator such as a conductive patch 412 formed over a ground plane 414. In an example, the patch 412 has a dimension (e.g., 2.5×2.5 mm) selected based on the desired operating frequency. The ground plane 414 has a dimension (e.g., 4.0×4.0 mm) selected to provide the desired directivity of patch antenna 410. A larger ground plane may result in smaller back lobes. In an example, a feed point 416 is located near the center of patch 412 and is the point at which an output RF signal is applied to patch antenna 410 for transmission. Multiple feed points may also be used to vary the polarization of the patch antenna 410. For example, at least two conductors may be used for dual polarization (e.g., a first conductor and a second conductor may be used for a horizontal-pol feed line and a vertical-pol feed line). The locations and number of the feed points may be selected to provide the desired impedance match to a feedline. Additional patches may be assembled in an array (e.g., 1×2, 1×3, 1×4, 1×5, 2×2, 2×3, 2×4, 2×5, 3×3, 3×4, etc. . . . ) to further provide a desired directivity and sensitivity. The ground plane 414 may be disposed under all of the patches in the array.

Figure 5:
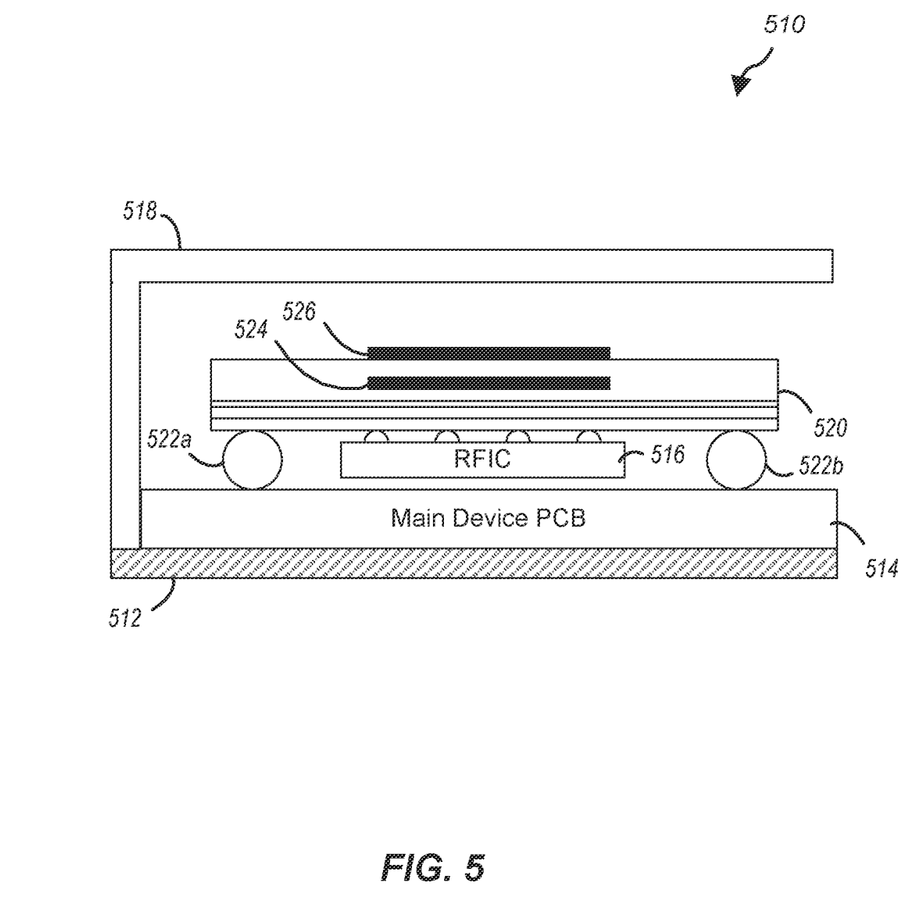
FIG. 5 is a side view of an example patch antenna array in a wireless device.

Referring to FIG. 5, a side view of an example patch antenna array in a wireless device 510 is shown. The wireless device 510 includes a display device 512, a device cover 518, and a main device printed circuit board (PCB) 514. The main device PCB 514 may be at least one printed circuit board or a plurality of printed circuit boards. A MMW module PCB 520 is operably coupled to the main device PCB 514 via at least one conductor 522a-b in one or more ball grid arrays (BGA). The BGA may be configured to enable one or more signals to flow between the MMW module PCB 520 and the main device PCB 514. The MMW module PCB 520 may include at least one patch antenna array 524 and corresponding passive patches 526 to form a wideband antenna. The MMW module PCB 520 also includes signal and ground layers. At least one radio frequency integrated circuit (RFIC) 516 is mounted to the MMW module PCB 520 and operates to adjust the power and the radiation beam patterns associated with the patch antenna array 524. The RFIC 516 is an example of an antenna controller and may be configured to utilize phase shifters and hybrid antenna couplers to control the power directed to the antenna array and to control the resulting beam pattern. The MMW module PCB 520 is configured in a backside configuration to generate a beam on the back side (i.e., opposite the display 512) of the wireless device 510.

Figure 6A:
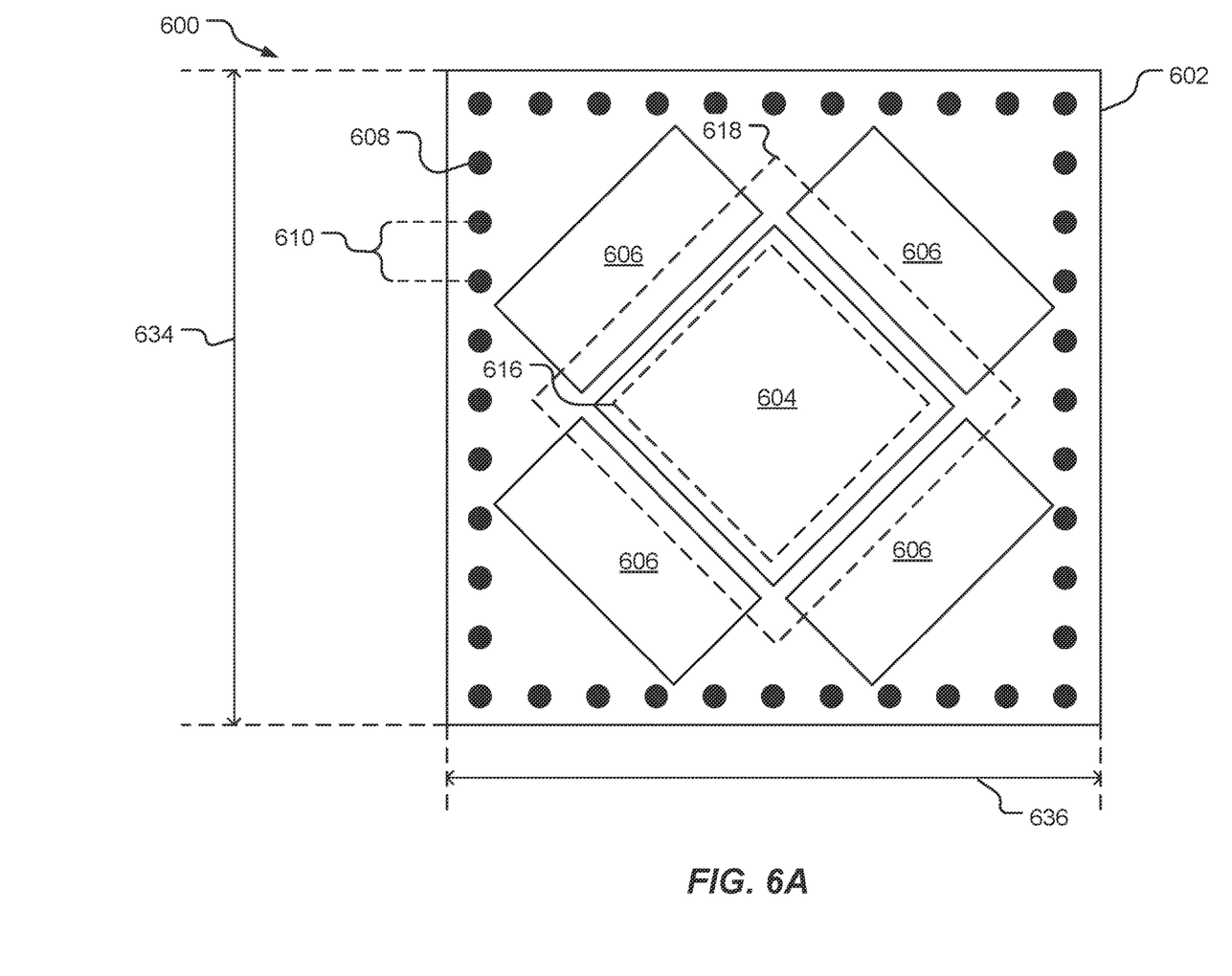
FIG. 6A is a top view of an example discrete antenna with a via wall.

Referring to FIG. 6A, a top view of an example discrete antenna 600 with a via wall is shown. The antenna 600 includes a plurality of metallic patches disposed within and on a dielectric substrate 602. For example, a surface patch 604 and a plurality of reflector patches 606 may be disposed on a top surface of the antenna 600. The surface patch is an example of a passive patch 526 and may be optional. The reflector patches 606 are also parasitic patches and are optional. The dimensions and locations of the reflector patches 606 may be varied to modify the directional gain of the antenna 600. A high band patch 616 may be disposed within the dielectric substrate 602 below the surface patch 604. The high band patch 616 is an example of a patch array 524. The relative orientations of the surface patch 604 and the high band patch 616 are configured such that the surface patch 604 is capacitively coupled to the high band patch 616. A low band patch 618 may be disposed within the dielectric substrate 602 on a plane that is below the high band patch 618. A plurality of via wall structures 608 are disposed along the circumference of the antenna 600 outward of the metallic patches. In an example, a first side length 634 of the antenna 600 is approximately 3.5 mm and a second length 636 is approximately 4.2 mm. The high band patch 616 may be a square patch with side lengths of approximately 1.6 mm, and the low band patch 618 may be a square patch with side lengths of approximately 2.4 mm. The dimensions of the patches are examples only, and not a limitation, as the patch sizes may vary based on the operational frequency of the antenna 600 and the dielectric constant of the substrate 602. The via wall structures 608 may be conductive material of approximately 150-200 microns in diameter, and may have a via spacing 610 of approximately one-twentieth (i.e., 1/20) of the operational frequency wavelength in the dielectric substrate 602. For example, the substrate 602 may have a dielectric constant of 3.5-4.0 and the via spacing 610 may be approximately 0.2 to 0.3 mm for 30 GHz operations. The via spacing 610 may be based on other frequencies associated with the high band and low band patches 616, 618 such as 24 GHz, 27 GHz, 38 GHz based on expected band activity for a specific wireless application in which the antenna 600 will be used.

Figure 6B:
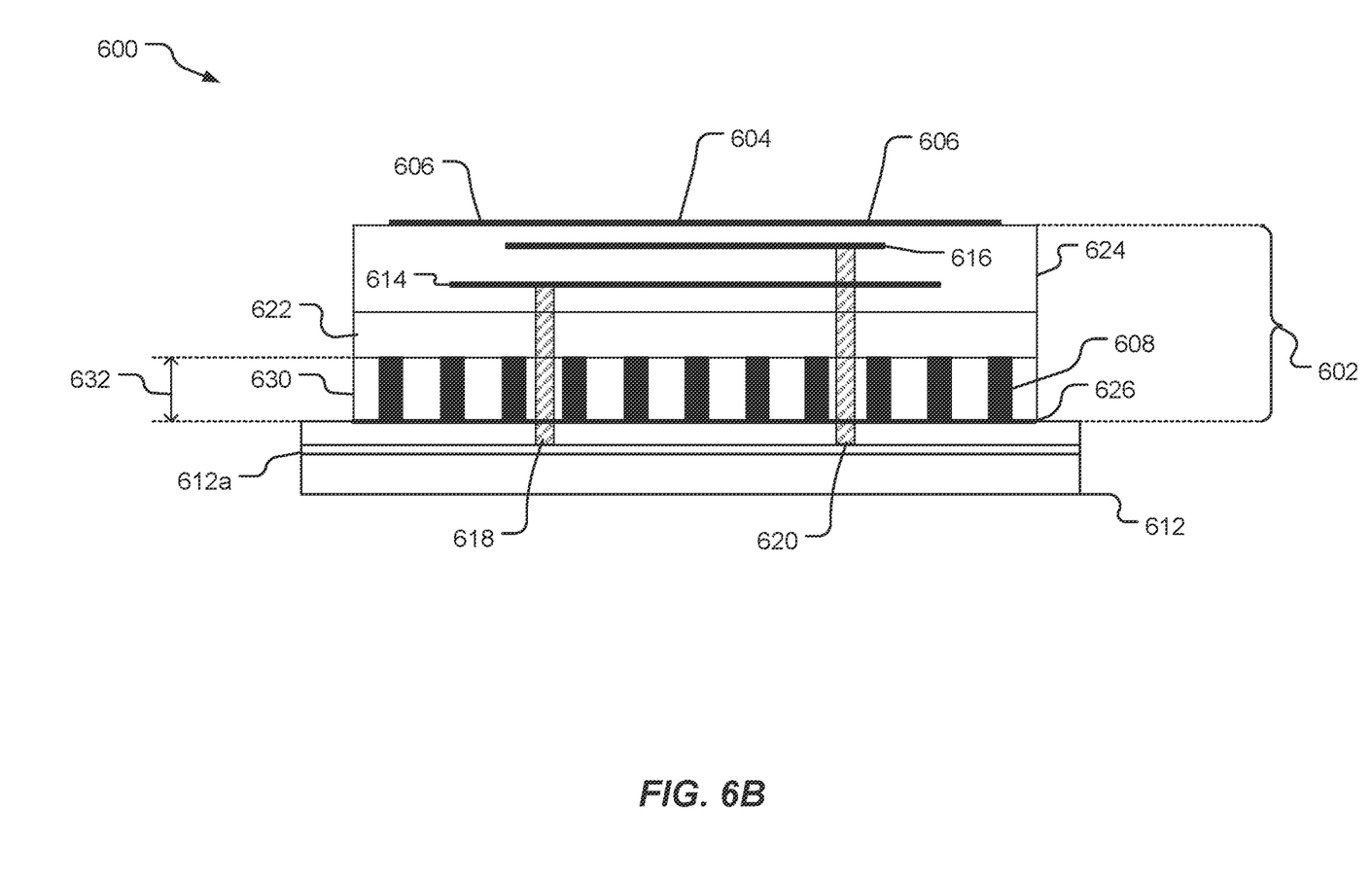
FIG. 6B is a side view of the example discrete antenna with the via wall.

Referring to FIG. 6B, a side view of the example discrete antenna 600 is shown. The antenna 600 may include, or be disposed on, an active component layer 612 including one or more feedlines 612a configured to operably couple the high band patch 616 and the low band patch 614 to one or more communications circuits such as the RFIC 516. In an example, the antenna 600 is a quad-fed 45 degree slanted stacked patch design for low and high bands with horizontal and vertical polarizations. The antenna 600 may be configured to cover a tri-band range including 24.25-27.5 GHz, 27.5-28.35 GHz, and 37-40 GHz. The feedlines 612a may be electrically coupled to a plurality of feed vias such as a low band feed via 618 and a high band feed via 620. The feed vias 618, 620 are electrically coupled to the respective low band patch 614 and the high band patch 616. Additional feed vias may be used for different polarizations and feed point configurations. In an example, the dielectric substrate 602 may be prepreg material and the antenna 600 may be manufactured with 12 or 14 levels. The dielectric substrate 602 may include floating metal layers (not shown in FIG. 6B) to increase the structural integrity of the antenna 600. The antenna layers may include a core layer 622 disposed between an upper layer 624 and a lower layer 630. The core layer 622 may be a different dielectric material configured to increase the stiffness of the antenna 600. The lower layer 630 may include copper cladding, or another conductive material, to form a ground plane 626 between the substrate 602 and the active component layer 612. Each of the via wall structures 608 are electrically coupled to the ground plane 626. In an example, the upper layer may have a thickness of approximately 300 microns, the core layer 622 may be approximately 200 microns thick, and the lower layer 630 may be approximately 300 microns thick. A via wall structure height 632 may be approximately 300 microns. In general, the via wall structure height 632 may be designed to vary the response of the antenna 600. For example, a larger wall structure height 632 can improve the gain for lower frequency operations, and a lower wall structure height 632 can improve the gain for higher frequency operations. The heights and dimensions of the layers are examples only and not limitations and other dimensions may be used based on the desired operational frequencies, the dielectric properties of the substrate 602, and the manufacturing processes used to construct the antenna 600. In an example, a metal deposition process may be used to dispose copper, silver, or aluminum as the low frequency patch 614 and the high frequency patch 616 within the layers of the substrate 602, and as the surface patch 604 and the reflectors 606.

As depicted in FIG. 6B, the example antenna 600 is comprised of conductors on various parallel planes and conductive vias to connect different elements in the planes and to create the via wall structures 608. In an example, the antenna 600 may include a first patch such as the low band patch 614 for operating in a first frequency range, and a second patch such as the high band patch 616 for operating in a second frequency range. The first patch and the second patch may be disposed within a perimeter of vias such as the via wall structures 608. Other configurations of patches may also be used. For example, the surface patch 604 may be disposed on a first plane of the antenna 600 such as a first surface of the dielectric substrate 602. The reflectors 606 may be optionally disposed on the first plane (i.e., coplanar) with the surface patch 604. The high frequency patch 616 is disposed on a second plane of the antenna 600 such that the second plane is below the first surface of the substrate 602 (e.g., within the substrate 602). The low band patch 614 is disposed on a third plane of the antenna 600, such that the third plane is located below the second plane (e.g., further from the first surface of the substrate). The ground plane 626 is disposed on a fourth plane in the antenna 600 such that the fourth plane is below the third plane. The dielectric substrate 602 is within the gaps between the ground plane and the patches 604, 614, 616. The via wall structures 608 are electrically coupled to the ground plane 626 and extend orthogonally from the fourth plane towards the first surface of the antenna within the dielectric substrate 602. The height 632 of the via wall structures 608 may vary to improve the gain of the antenna 600 for some portions of the bandwidth. For example, the height 632 may vary between 100-500 microns.

In operation, the presence of the via wall structures 608 strengthens the ground condition and isolates the discrete antenna 600 from other antenna modules in an antenna array. The via wall structures 608 in the discrete antenna 600 improves coupling (e.g., isolation) between ports. Antenna gain and cross-polarization levels are also improved. The cross-polarization improvement enables improved MIMO operation.

Figure 7A:
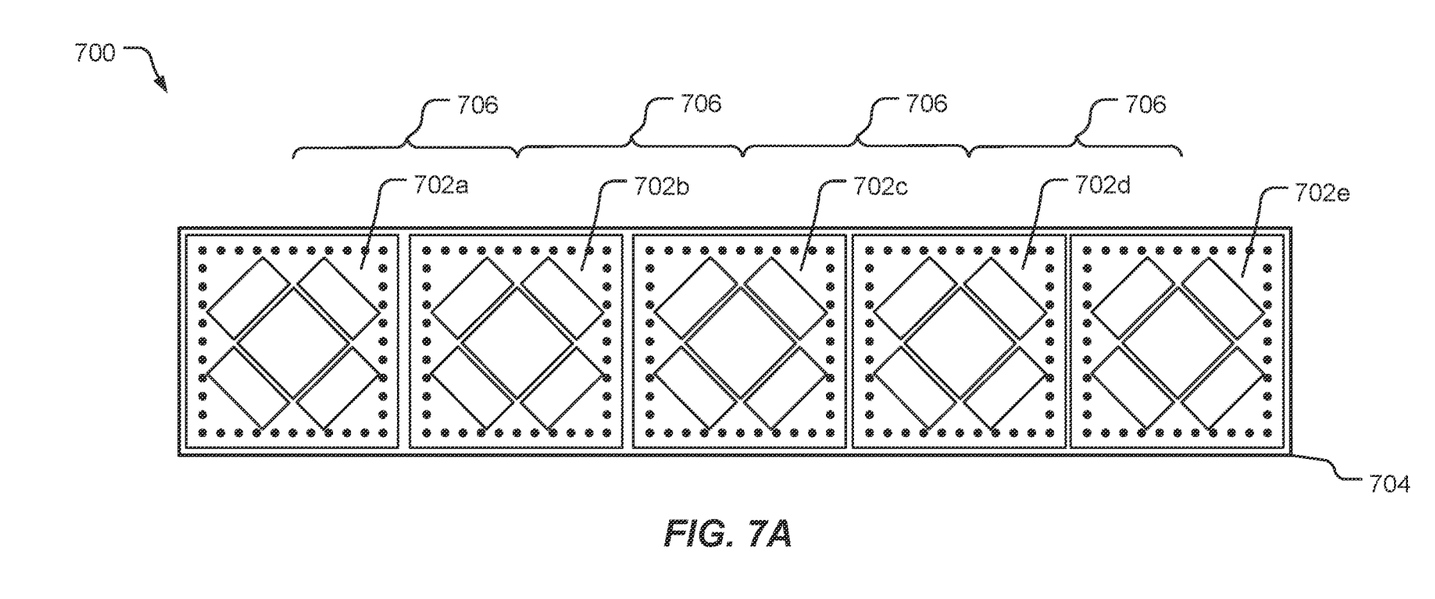
FIG. 7A is a top view of an example antenna array with a plurality of discrete antennas with respective via walls.
Figure 7B:
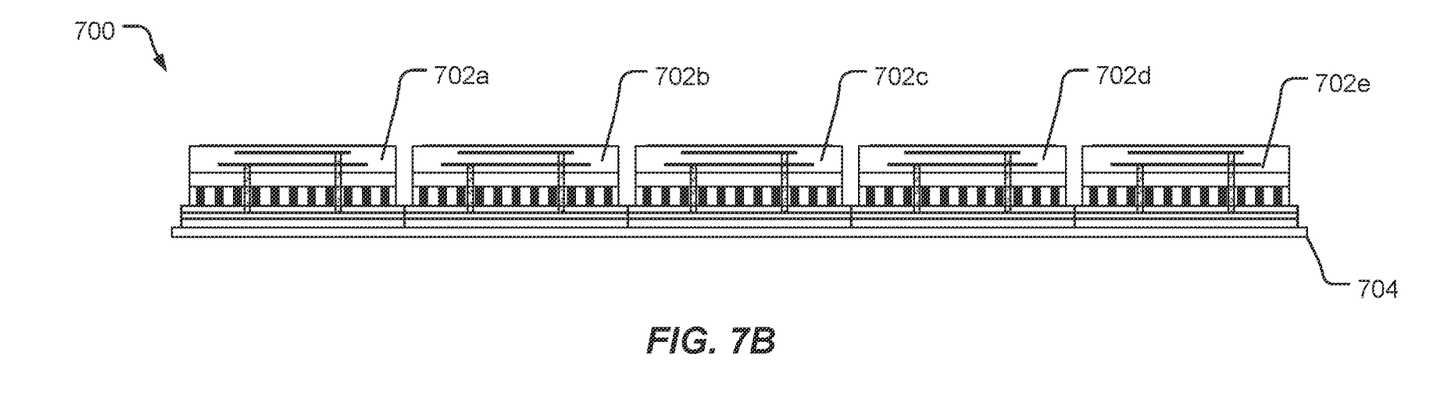
FIG. 7B is a side view of the example antenna array of FIG. 7A.

Referring to FIGS. 7A and 7B, with further reference to FIGS. 6A and 6B, a top view and a side view of an antenna array 700 with a plurality of discrete antennas 600 are shown. The antenna array 700 is an example of a 1×5 array with five of the antennas 600 disposed on a mounting substrate 704, such as a PCB material. The antenna array 700 is an example of an antenna system for use in the wireless device 210. For example, the antenna array 700 may be used in place of the antenna system 220 depicted in FIG. 2 and/or the antenna systems 320, 340 in FIG. 3. The antenna array 700 includes a first antenna module 702a, a second antenna module 702b, a third antenna module 702c, a fourth antenna module 702d, and a fifth antenna module 702e. Each of the antenna modules 702a-e are examples of the antenna 600 and are operably coupled to the RFIC 516 via respective feed lines 612a. Each of the antenna modules 702a-e may be configured for horizontal and/or vertical polarization. In an example, the antenna array 700 may be approximately 3.5 mm along a first axis and 23.8 mm along a second axis. An element spacing 706 may be approximately 4.5 mm. Each of the antenna modules 702a-e includes the via wall structures 608 as described for the antenna 600.

Figure 8:
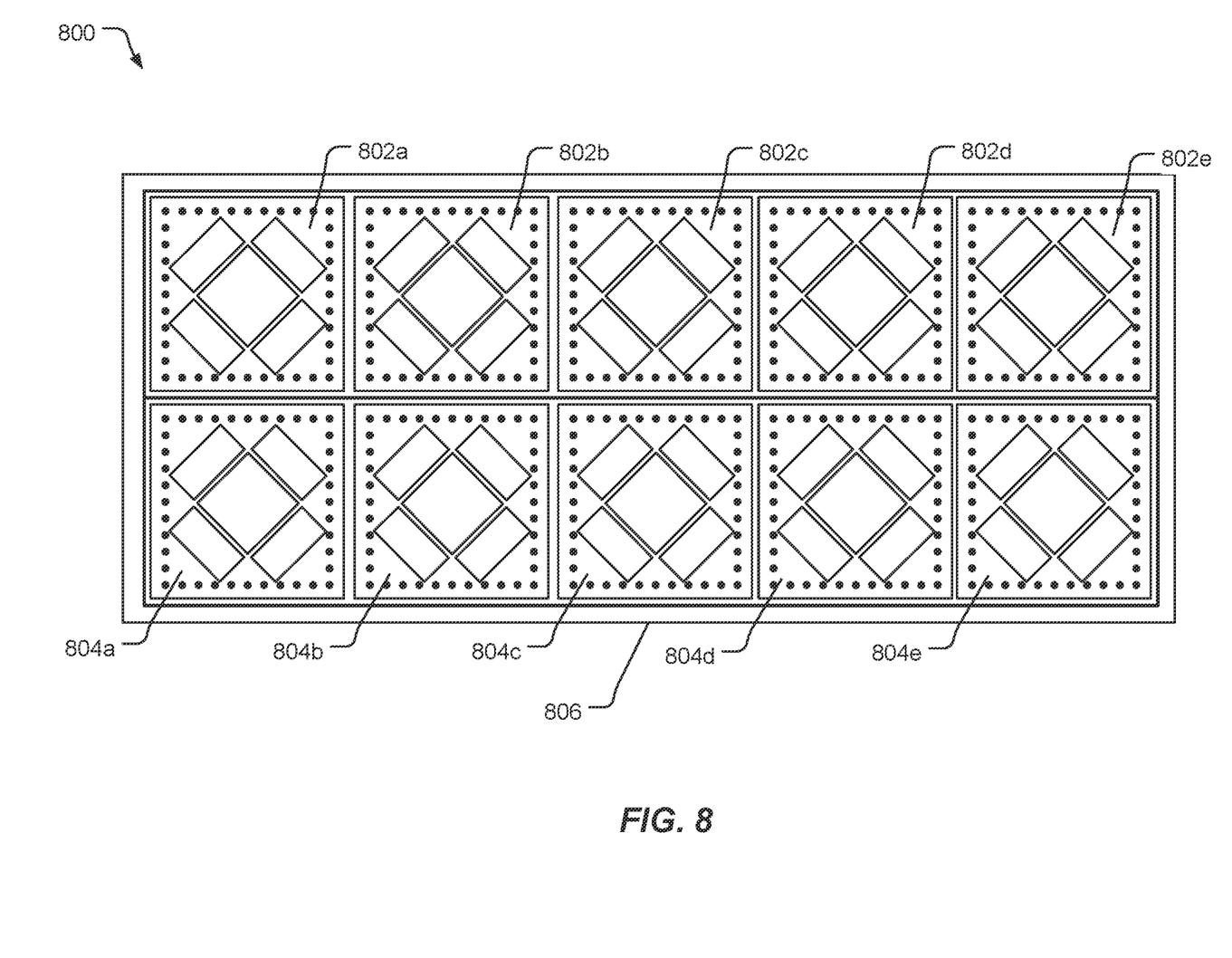
FIG. 8 is a top view of an example two axis antenna array with a plurality of discrete antennas with respective via walls.

Referring to FIG. 8, with further reference to FIGS. 7A and 7B, an example two axis antenna array 800 with a plurality of discrete antennas 600 with respective via walls is shown. The antenna array 800 is an example of a 2×5 array on a mounting substrate 806. Other array sizes (e.g., 1×3, 1×4, 1×6, 2×2, 2×3, 2×4, 2×6, 3×4, 3×5, 3×6, etc. . . . ) may be used. Different arrays may be used to improve directional gain in one or more axes. The antenna array 800 is another example of an antenna system for use in the wireless device 210. For example, the antenna array 800 may be used in place of the antenna system 220 depicted in FIG. 2 and/or the antenna systems 320, 340 in FIG. 3. The antenna array 800 includes a first row first antenna module 802a, a first row second antenna module 802b, a first row third antenna module 802c, a first row fourth antenna module 802d, and a first row fifth antenna module 802e. The antenna array 800 also includes a second row first antenna module 804a, a second row second antenna module 804b, a second row third antenna module 804c, a second row fourth antenna module 804d, and a second row fifth antenna module 804e. Each of the antenna modules 802a-e. 804a-e are examples of the antenna 600 and are operably coupled to the RFIC 516 via respective feed lines 612a. Each of the antenna modules 802a-e, 804a-e may be configured for horizontal and/or vertical polarization. In an example, the antenna array 800 may be approximately 7.0 mm along a first axis and 23.8 mm along a second axis. Each of the antenna modules 802a-e, 804a-e includes the via wall structures 608 as described for the antenna 600.

Figure 9:
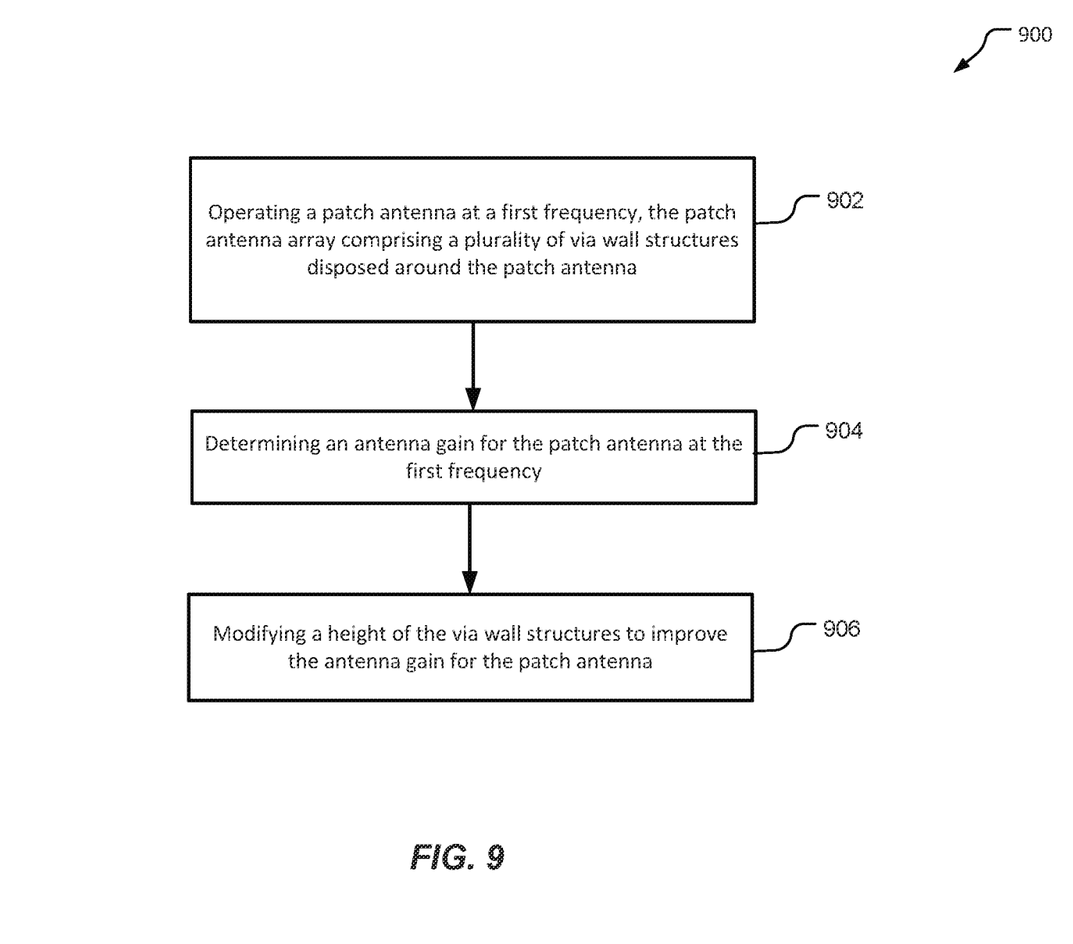
FIG. 9 is an example process flow for determining a height of via wall elements.

Referring to FIG. 9, a method 900 for determining a height of via wall elements includes the stages shown. The method 900 is, however, an example only and not limiting. The method 900 may be altered, e.g., by having stages added, removed, rearranged, combined, performed concurrently, and/or having single stages split into multiple stages.

At stage 902, the method 900 includes operating a patch antenna at a first frequency, the patch antenna array comprising a plurality of via wall structures disposed around the patch antenna. The radio frequency integrated circuit 516 is a means for operating the patch antenna. In an example, the antenna 600 includes at least a first patch such as the low band patch 614 for operating on a first frequency, and/or a second patch such as the high band patch 616 for operating on a second frequency. Both of the first patch and/or the second patch are disposed above a ground plane 626 and within a perimeter of via wall structures 608 each of which are coupled to the ground plane 626. Referring to FIGS. 6A and 6B, the via wall structures 608 and the ground plane 626 may be conductive material such as copper, silver, gold, etc., disposed along the perimeter of the antenna 600. The via wall structures 608 may be approximately 150-200 microns in diameter, in an example. Other diameters may also be used, and the via spacing 610 may be approximately one-twentieth (i.e., ¹/₂₀) of the first frequency wavelength in the dielectric substrate 602 (e.g., based on a dielectric constant of the substrate). In an example, the substrate 602 may have a dielectric constant of 3.5-4.0 and the via spacing 610 may be approximately 0.2 to 0.3 mm when the first frequency is approximately 30 GHz. Other frequency values may be used for the first frequency. For example, the antenna 600 may be configured to cover a tri-band range including 24.25-27.5 GHz, 27.5-28.35 GHz, and 37-40 GHz and the first frequency may be selected from these ranges.

At stage 904, the method 900 includes determining an antenna gain for the patch antenna at the first frequency. A RF field strength meter, or an electromagnetic (EM) simulation software may be means for determining an antenna gain. In an example, a RF strength meter may be used to detect the strength of a transmitted RF field at various locations around the patch antenna array. In another example, a 3D EM field simulator such as Ansys HFSS may be used to determine the antenna gain. An antenna model in HFSS may include the components of the antenna 600, or the antenna array 700, with the via wall structures 608, and the software may be used to generate a frequency response based on the antenna model.

At stage 906, the method includes modifying a height of the via wall structures to improve the antenna gain for the patch antenna. The EM simulation software may be a means for varying the height of the via wall structures. Additional models with variations on the height 632 of the via walls may be analyzed with the HFSS software and the corresponding frequency response results may be compared. In an example, the via wall heights may iterate through different heights at 5 micron increments between 100 and 500 microns to determine an appropriate via wall structure height 632 based on the first frequency. The modeled via wall structure height 632 may be used to manufacture the antenna 600.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, as used herein, "or" as used in a list of items prefaced by "at least one of" or prefaced by "one or more of" indicates a disjunctive list such that, for example, a list of "at least one of A, B, or C," or a list of "one or more of A, B, or C." or "A, B. or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Components, functional or otherwise, shown in the figures and/or discussed herein as being connected, coupled (e.g., communicatively coupled), or communicating with each other are operably coupled. That is, they may be directly or indirectly, wired and/or wirelessly, connected to enable signal transmission between them.

"About" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

What is claimed is:

1. A wireless device, comprising:
   at least one radio frequency integrated circuit; and
   at least one patch antenna operably coupled to the at least one radio frequency integrated circuit, comprising:
   a first patch operably coupled to the at least one radio frequency integrated circuit;
   a ground plane disposed below the first patch; and
   a plurality of via wall structures disposed around the first patch, wherein each of the plurality of via wall structures is electrically coupled to the ground plane.

2. The wireless device of claim 1 further comprising a second patch operably coupled to the at least one radio frequency integrated circuit, wherein the second patch is disposed between the first patch and the ground plane.

3. The wireless device of claim 2 wherein the first patch is configured to operate in a first frequency range and the second patch is configured to operate in a second frequency range.

4. The wireless device of claim 3 wherein a via spacing between each of the plurality of via wall structures is based on the first frequency range.

5. The wireless device of claim 3 wherein a via spacing between each of the plurality of via wall structures is based on the second frequency range.

6. The wireless device of claim 3 wherein the first frequency range is 37-40 GHz and the second frequency range is 24-30 GHz.

7. The wireless device of claim 2 wherein the first patch and the second patch are configured for horizontally polarized signals and vertically polarized signals.

8. The wireless device of claim 2 wherein the first patch is a square patch with side lengths of 1.6 millimeters, and the second patch is a square patch with side lengths of 2.4 millimeters.

9. The wireless device of claim 1 wherein a height of each of the via wall structures is within a range of 100-400 microns.

10. The wireless device of claim 1 wherein a via spacing between each of the plurality of via wall structures is in a range of 0.2 to 0.3 millimeters.

11. The wireless device of claim 1 further comprising a surface patch disposed above the first patch, wherein the surface patch is capacitively coupled to the first patch.

12. The wireless device of claim 11 further comprising one or more reflector patches disposed adjacent to and coplanar with the surface patch.

13. A patch antenna, comprising:
   a first patch disposed on a dielectric substrate;
   a ground plane disposed below the first patch, wherein the dielectric substrate is within a gap between the first patch and the ground plane; and
   a plurality of via wall structures disposed around the first patch, wherein each of the plurality of via wall structures is electrically coupled to the ground plane and extend orthogonally from the ground plane towards the first patch.

14. The patch antenna of claim 13 further comprising a second patch disposed within the dielectric substrate, wherein the second patch is disposed within the gap between the first patch and the ground plane.

15. The patch antenna of claim 14 wherein the first patch is configured to operate in a first frequency range and the second patch is configured to operate in a second frequency range.

16. The patch antenna of claim 15 wherein a via spacing between each of the plurality of via wall structures is based on the first frequency range.

17. The patch antenna of claim 15 wherein a via spacing between each of the plurality of via wall structures is based on the second frequency range.

18. The patch antenna of claim 15 wherein the first frequency range is 37-40 GHz and the second frequency range is 24-30 GHz.

19. The patch antenna of claim 14 wherein the first patch and the second patch are configured for horizontally polarized signals and vertically polarized signals.

20. The patch antenna of claim 14 wherein the first patch is a square patch with side lengths of 1.6 millimeters, and the second patch is a square patch with side lengths of 2.4 millimeters.

21. The patch antenna of claim 13 wherein a height of each of the via wall structures is within a range of 100-400 microns.

22. The patch antenna of claim 13 wherein a via spacing between each of the plurality of via wall structures is in a range of 0.2 to 0.3 millimeters.

23. The patch antenna of claim 13 further comprising a surface patch disposed above the first patch on a top surface of the dielectric substrate, wherein the surface patch is capacitively coupled to the first patch.

24. The patch antenna of claim 23 further comprising one or more reflector patches disposed on the top surface of the dielectric substrate adjacent to the surface patch.

25. A patch antenna array, comprising:
   a plurality of patch antennas disposed on a mounting substrate, wherein each patch antenna comprises:
      a first patch disposed on a dielectric substrate;
      a ground plane disposed below the first patch, wherein the dielectric substrate is within a gap between the first patch and the ground plane; and
      a plurality of via wall structures disposed around the first patch, wherein each of the plurality of via wall structures is electrically coupled to the ground plane and extend orthogonally from the ground plane towards the first patch.

26. The patch antenna array of claim 25 wherein each of the plurality of patch antennas further comprising a second patch disposed within the dielectric substrate, wherein the second patch is disposed within the gap between the first patch and the ground plane.

27. The patch antenna array of claim 26 wherein the first patch and the second patch of each of the plurality of patch antennas is operably coupled to a radio frequency integrated circuit.

28. The patch antenna array of claim 25 wherein the plurality of patch antennas are disposed in a 1 by 5 array.

29. The patch antenna array of claim 25 wherein the plurality of patch antennas are disposed in a 2 by 5 array.

30. A patch antenna, comprising:
   a dielectric substrate having a top surface and a bottom surface;
   a surface patch disposed on the top surface of the dielectric substrate;
   a high frequency patch disposed within the dielectric substrate and below the surface patch, wherein the surface patch is capacitively coupled to the high frequency patch;
   a low frequency patch disposed within the dielectric substrate and between the high frequency patch and the bottom surface of the dielectric substrate;
   a ground plane disposed on the bottom surface of the dielectric substrate; and
   a plurality of via wall structures disposed within the dielectric substrate in a perimeter around the high frequency patch and the low frequency patch, wherein each of the plurality of via wall structures are electrically coupled to the ground plane and extend orthogonally from the ground plane towards the top surface of the dielectric substrate.

* * * * *